(12) United States Patent
Liao

(10) Patent No.: US 8,924,882 B2
(45) Date of Patent: Dec. 30, 2014

(54) METHOD FOR CONTROLLING A SOFTWARE DIRECTION PAD OF AN ELECTRONIC DEVICE, ELECTRONIC DEVICE AND COMPUTER-READABLE MEDIUM THEREOF

(75) Inventor: Hua-Li Liao, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 566 days.

(21) Appl. No.: 12/731,125

(22) Filed: Mar. 24, 2010

(65) Prior Publication Data

US 2011/0239150 A1    Sep. 29, 2011

(51) Int. Cl.
G06F 3/048 (2013.01)
G06F 3/0489 (2013.01)
G06F 3/0481 (2013.01)
G06F 3/0488 (2013.01)

(52) U.S. Cl.
CPC .......... *G06F 3/04892* (2013.01); *G06F 3/0481* (2013.01); *G06F 3/04886* (2013.01)
USPC ............................ 715/773; 715/856; 345/156

(58) Field of Classification Search
CPC ......... G06F 3/016; G06F 3/011; G06F 3/038; G06F 3/0202; G06F 3/0219; G06F 3/0213; G06F 3/0238; G06F 3/0489; G06F 3/023
USPC .................. 715/773, 856; 345/156, 168, 172
See application file for complete search history.

(56) References Cited

U.S. PATENT DOCUMENTS

| Patent/Pub No. | Date | Inventor | Ref |
|---|---|---|---|
| 6,332,024 B1* | 12/2001 | Inoue et al. | 379/433.06 |
| 6,370,282 B1* | 4/2002 | Pavley et al. | 382/311 |
| 6,587,132 B1* | 7/2003 | Smethers | 715/858 |
| 7,036,086 B2* | 4/2006 | Cobbley et al. | 715/773 |
| 8,244,294 B2* | 8/2012 | Chae et al. | 455/550.1 |
| 2005/0081149 A1* | 4/2005 | Vale | 715/526 |
| 2006/0242576 A1* | 10/2006 | Nagel et al. | 715/535 |
| 2006/0265668 A1* | 11/2006 | Rainisto | 715/816 |
| 2006/0271861 A1* | 11/2006 | Yolleck et al. | 715/760 |
| 2007/0016862 A1* | 1/2007 | Kuzmin | 715/700 |
| 2007/0132716 A1* | 6/2007 | Idzik et al. | 345/156 |
| 2007/0256025 A1* | 11/2007 | Yen et al. | 715/764 |
| 2009/0073003 A1* | 3/2009 | Chang | 341/22 |
| 2009/0319943 A1* | 12/2009 | Ha | 715/802 |

* cited by examiner

*Primary Examiner* — Anil Bhargava
(74) *Attorney, Agent, or Firm* — Winston Hsu; Scott Margo

(57) ABSTRACT

A method for controlling a software direction pad of an electronic device, configured to display a software keyboard and an editing area, includes the following steps: displaying the software direction pad in response to a start input, wherein the software direction pad is used for moving a cursor on the editing area; and closing and hiding the software direction pad in response to a close input received through the software keyboard.

17 Claims, 9 Drawing Sheets

METHOD FOR CONTROLLING A SOFTWARE DIRECTION PAD OF AN ELECTRONIC DEVICE, ELECTRONIC DEVICE AND COMPUTER-READABLE MEDIUM THEREOF

BACKGROUND OF THE INVENTION

1. Field of the Invention

The present application relates to a method for controlling a software direction pad of an electronic device, an electronic device, and a related computer-readable medium, and more particularly, to a method for automatically displaying and closing/hiding the software direction pad with an easy way, an electronic device, and a related computer-readable medium.

2. Description of the Prior Art

In today's consumer electronics markets, portable electronic products such as personal digital assistants (PDAs), mobile phones, and PDA phones have already adopted a touch panel as their interface tool for data communication. Currently, the electronic products are usually designed with the trend of light weight and small size, and hence there is no enough space to accommodate conventional input devices such as keyboards or mice. Especially with the demands for human nature design in Tablet PCs, display devices equipped with a touch panel are becoming an important component of a variety of electronic products.

Currently, most of the electronic devices equipped with a touch panel do not design a hardware direction pad (or called as a hardware navigation pad). It may cause inconvenience for a user who wants to move the cursor to accurate positions while doing edits on the electronic device, especially the electronic device equipped with a small-scale touch panel. However, a fixed type software direction pad on the software keyboard design will make the editing become too narrow.

Hence, how to provide a better software direction pad design to fulfill the user's demands for specific editing without impacting the visual screen of the editing area have become an important topic of this field.

SUMMARY OF THE INVENTION

It is one of the objectives of the claimed application to provide a method for controlling a software direction pad of an electronic device, an electronic device, and a related computer-readable medium to solve the abovementioned problems.

According to one example, a method for controlling a software direction pad of an electronic device is provided, wherein the electronic device is configured to display a software keyboard and an editing area. The method includes the following steps: displaying the software direction pad in response to a start input, wherein the software direction pad is used for moving a cursor on the editing area; and closing and hiding the software direction pad in response to a close input received through the software keyboard.

According to another example, a computer-readable medium is provided. The computer-readable medium stores a computer program having instructions for performing a method for controlling a software direction pad of an electronic device, which cause the electronic device, when loaded, to execute the following steps: displaying the software direction pad in response to a start input, wherein the software direction pad is used for moving a cursor on the editing area; and closing and hiding the software direction pad in response to a close input received through the software keyboard.

According to another example, an electronic device is provided. The electronic device includes a display unit, an activation module, and an inactivation module. The display unit is configured to display a software keyboard and an editing area. The activation module is coupled to the display unit, and is configured to control the display unit to display a software direction pad in response to a start input, wherein the software direction pad is used for moving a cursor on the editing area. The inactivation module is coupled to the display unit, and is configured to close and hide the software direction pad in response to a close input received through the software keyboard.

These and other objectives of the present application will no doubt become obvious to those of ordinary skill in the art after reading the following detailed description of the preferred example that is illustrated in the various figures and drawings.

DETAILED DESCRIPTION

Figure 1:
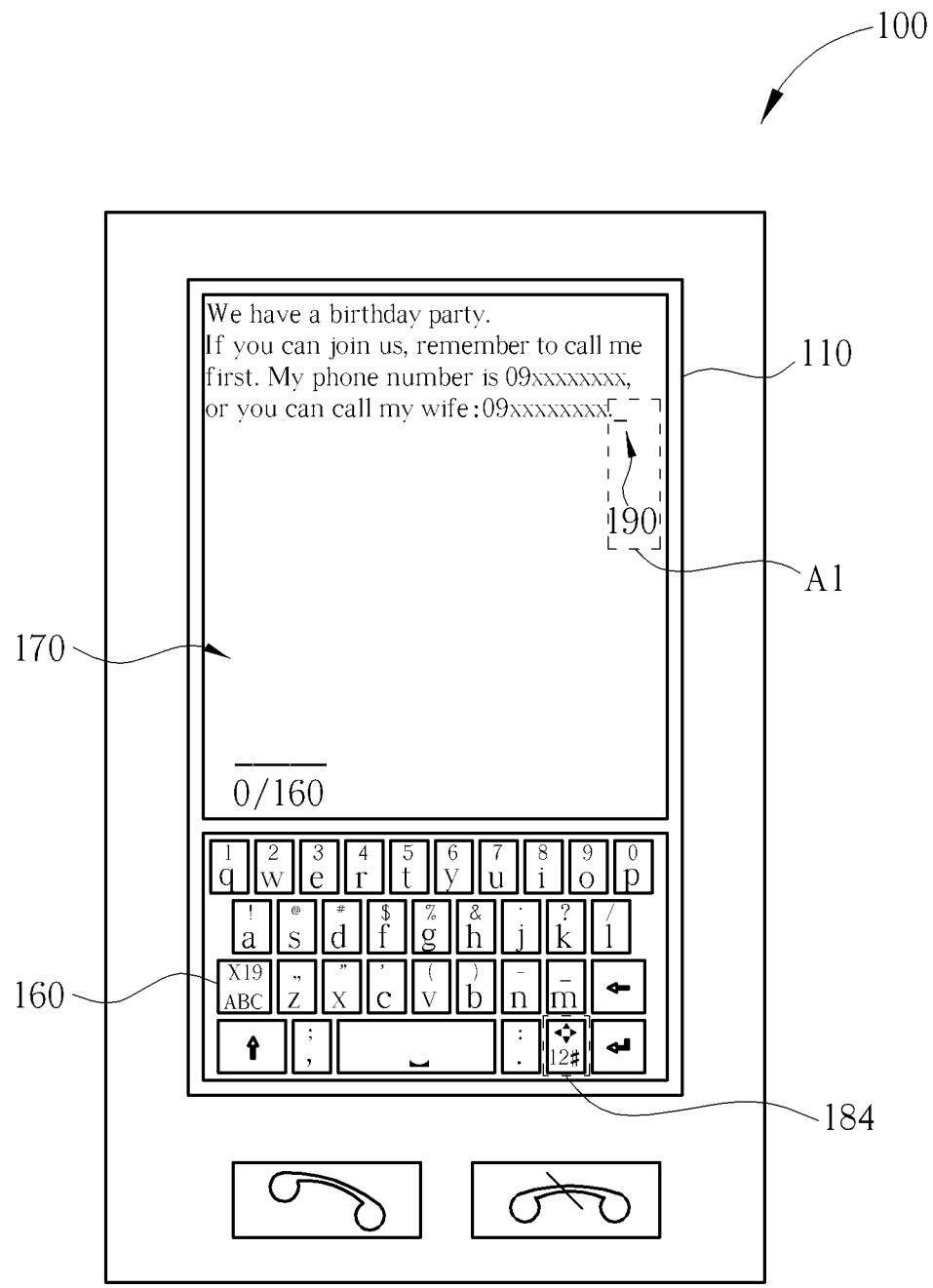
FIG. 1 and FIG. 2 are schematic diagrams of an electronic device for controlling a software direction pad of the electronic device according to an example of the present application.
Figure 2:
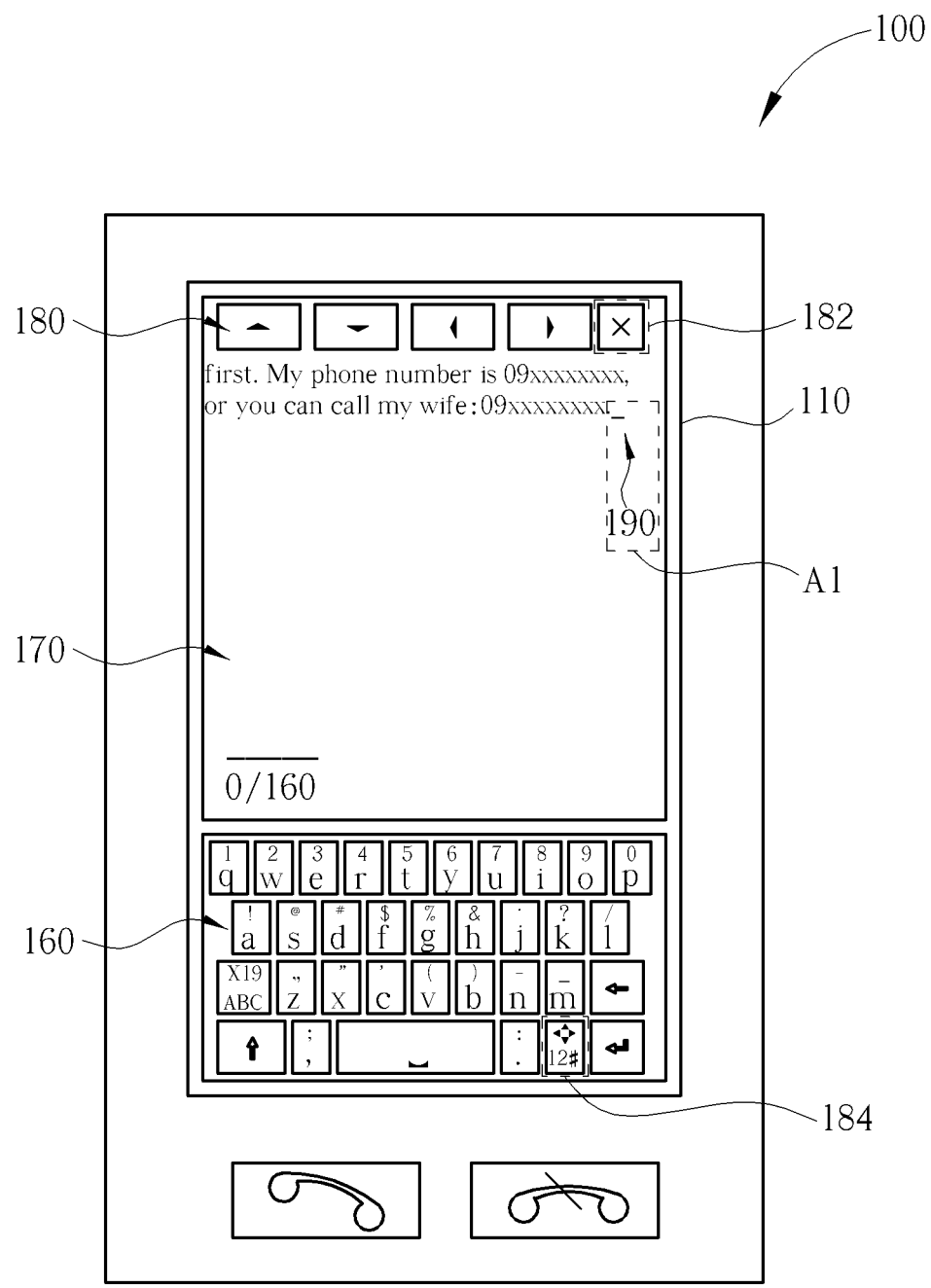

Please refer to FIG. 1 together with FIG. 2. FIG. 1 and FIG. 2 are schematic diagrams of an electronic device 100 for controlling a software direction pad of the electronic device 100 according to an example of the present application. As FIG. 1 and FIG. 2 depict, FIG. 1 indicates a condition that a software direction pad is inactivated while FIG. 2 indicates another condition that a software direction pad 180 is activated. As shown in FIG. 1, the electronic device 100 includes a display unit 110, wherein the display unit 110 is configured to display a software keyboard 160 and an editing area 170. As shown in FIG. 2, the display unit 110 of the electronic device 100 is configured to display the software keyboard 160, the editing area 170, and the software direction pad 180, wherein the software direction pad 180 is used for moving a cursor 190 on the editing area 170. Therefore, with the activation of the software direction pad 180, it could bring a lot convenience to a user to move the cursor 190 or edit fields on the editing area 170 while doing edits on the electronic device 110 which does not have a hardware direction pad or a track ball. Additionally, the software direction pad 180 can be (automatically) closed and hided if it is not in use, such that the editing area 170 won't be occupied by the software direction pad 180 and will has a larger visual screen.

Figure 3:
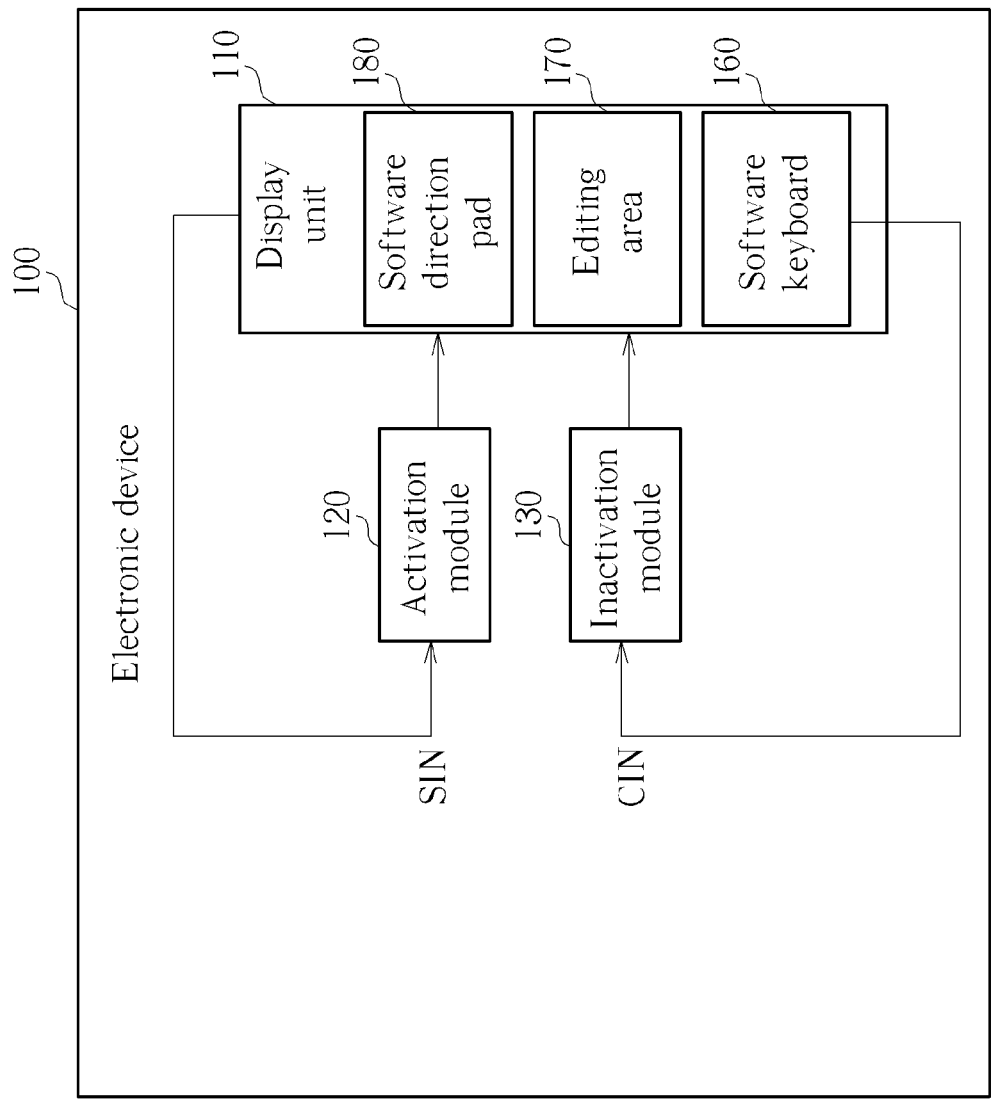
FIG. 3 is a block diagram of an electronic device for controlling a software direction pad of the electronic device according to a first example of the present application.

Please refer to FIG. 3 together with FIG. 1 and FIG. 2. FIG. 3 is a block diagram of the electronic device 100 shown in FIG. 1 and FIG. 2 according to a first example of the present application. As shown in FIG. 3, the electronic device 100 may include the display unit 110, an activation module 120, and an inactivation module 130. As abovementioned, the display unit 110 is configured to display the software keyboard 160 and the editing area 170 (please refer to FIG. 1 or FIG. 2). The activation module 120 is coupled to the display unit 110, and is configured to control the display unit 110 to display the software direction pad 180 in response to a start input SIN. The inactivation module 130 is coupled to the display unit 110, and is configured to close and hide the software direction pad 180 in response to a close input CIN received through the software keyboard 160. In other words, when the start input SIN is received from a user by the activation module 120, the activation module 120 controls the display unit 110 to show the software direction pad 180, such as shown in FIG. 2. When the close input CIN is received from a user through the software keyboard 160 by the inactivation module 130, the inactivation module 130 controls the display unit 110 to (automatically) close and hide the software direction pad 180, such as shown in FIG. 1.

Please keep referring to FIG. 3. The activation module 120 is further coupled to the display unit 110. What calls for special attention is that, in one example, the start input SIN may be generated by pressing (or long pressing) a start button (e.g. the button 184 shown in FIG. 1 or FIG. 2) corresponding to the software direction pad 180. In another example, the start input SIN may be generated by touching (or long touching) the editing area 170. In still another example, the start input SIN may be generated by touching (or long touching) a designated area including the cursor 190 (e.g., the area A1 shown in FIG. 1 or FIG. 2) in the editing area 170. That is to say, the start input SIN can be derived through the start button 184 corresponding to the software direction pad 180, through the editing area 170, or through the designated area A1 including the cursor 190, but this is not meant to be considered as a limitation of the present application. Those skilled in the art should appreciate that various modifications to the way how to generate the start input SIN may be made without departing from the spirit of the present application, which also belongs to the scope of the present application.

Be noted that in the abovementioned example, the close input CIN is received through the software keyboard 160. For example, the close input CIN is generated when the software keyboard 160 is used by the user to do edits (e.g., type letters) on the electronic device 100. After the close input CIN is received by the inactivation module 130, it controls the display unit 110 to (automatically) close and hide the software direction pad 180. In this way, when the user finishes using the software direction pad 180 to move the cursor 190 and then starts to use the software keyboard 160 to type, the software direction pad 180 is automatically closed and hided. In other examples, the close input CIN may be received through a close button (e.g., the button 182 shown in FIG. 2) corresponding to the software direction pad 180. For example, the close input CIN may be generated when the button 182 is (long) pressed or touched by the user. And then the inactivation module 130 controls the display unit 110 to close and hide the software direction pad 180 after receiving the close input CIN. In other words, the user still can use the close button 182 to close and hide the software direction pad 180.

Please note that the electronic device 100 may be a mobile phone, a personal digital assistant (PDA), a PDA phone, a smart phone, a computer, a notebook, a tablet PC, a music player, a game device, or a digital camera. But the present application is not limited to this only, and it can be any type of electronic devices equipped with a display unit, especially a small-scale display unit. In one example, the electronic device 100 may be a touch-controlled device, and the display unit 110 may be a touch screen, but this in no way should be considered as a limitation of the present application.

In the abovementioned examples, it merely gives considerations to how to automatically display and close/hide the software direction pad 180 on the display unit 110. However, it gives no consideration to the displayed position of the software direction pad 180. Hence, under some situations, the displayed position of the software direction pad 180 may cover some important character strings (such as titles) or may cover the cursor 190, which causes inconvenience to the user.

Figure 4:
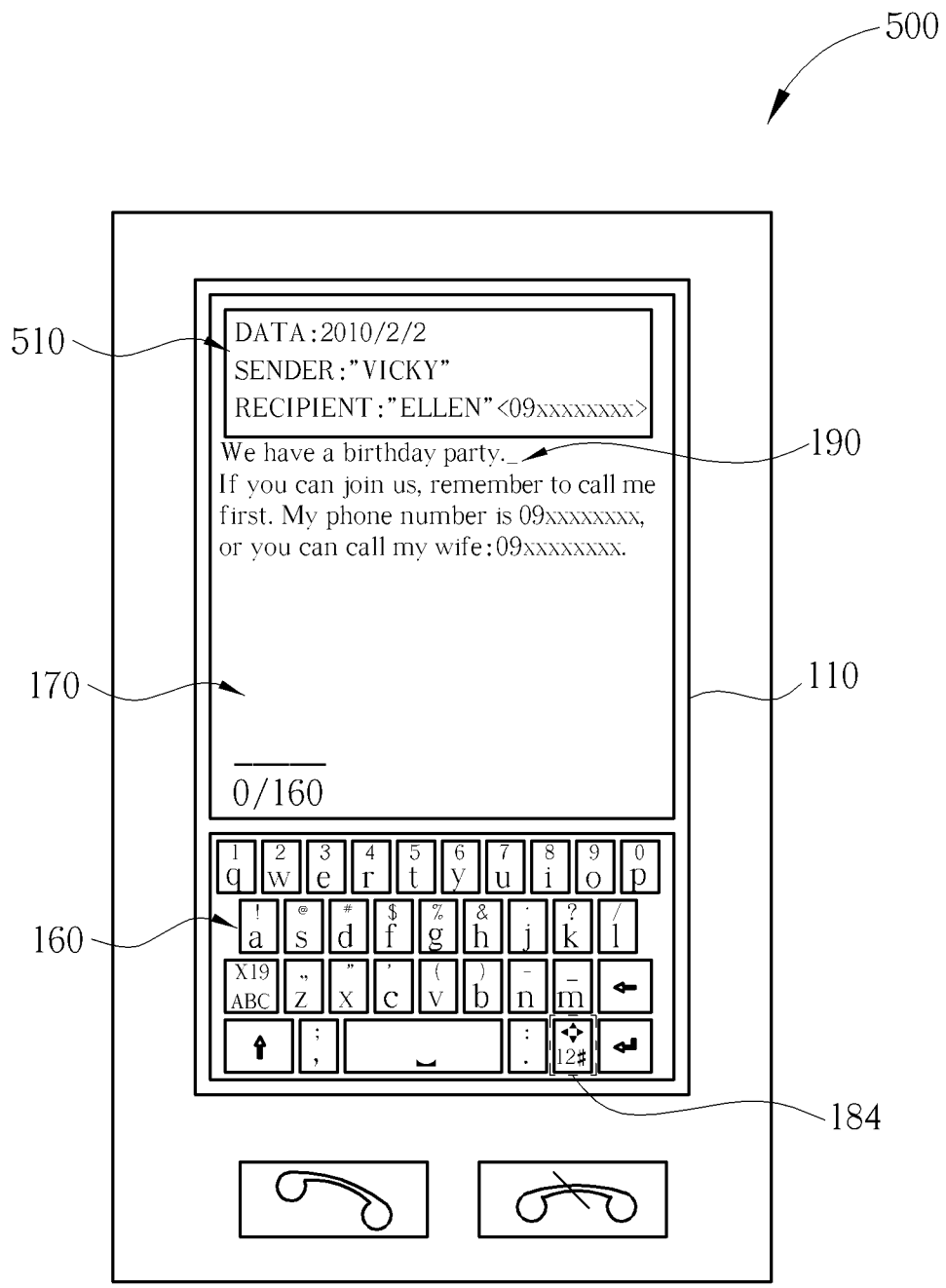
FIG. 4 and FIG. 5 are schematic diagrams of an electronic device for controlling a software direction pad of the electronic device according to another example of the present application.
Figure 5:
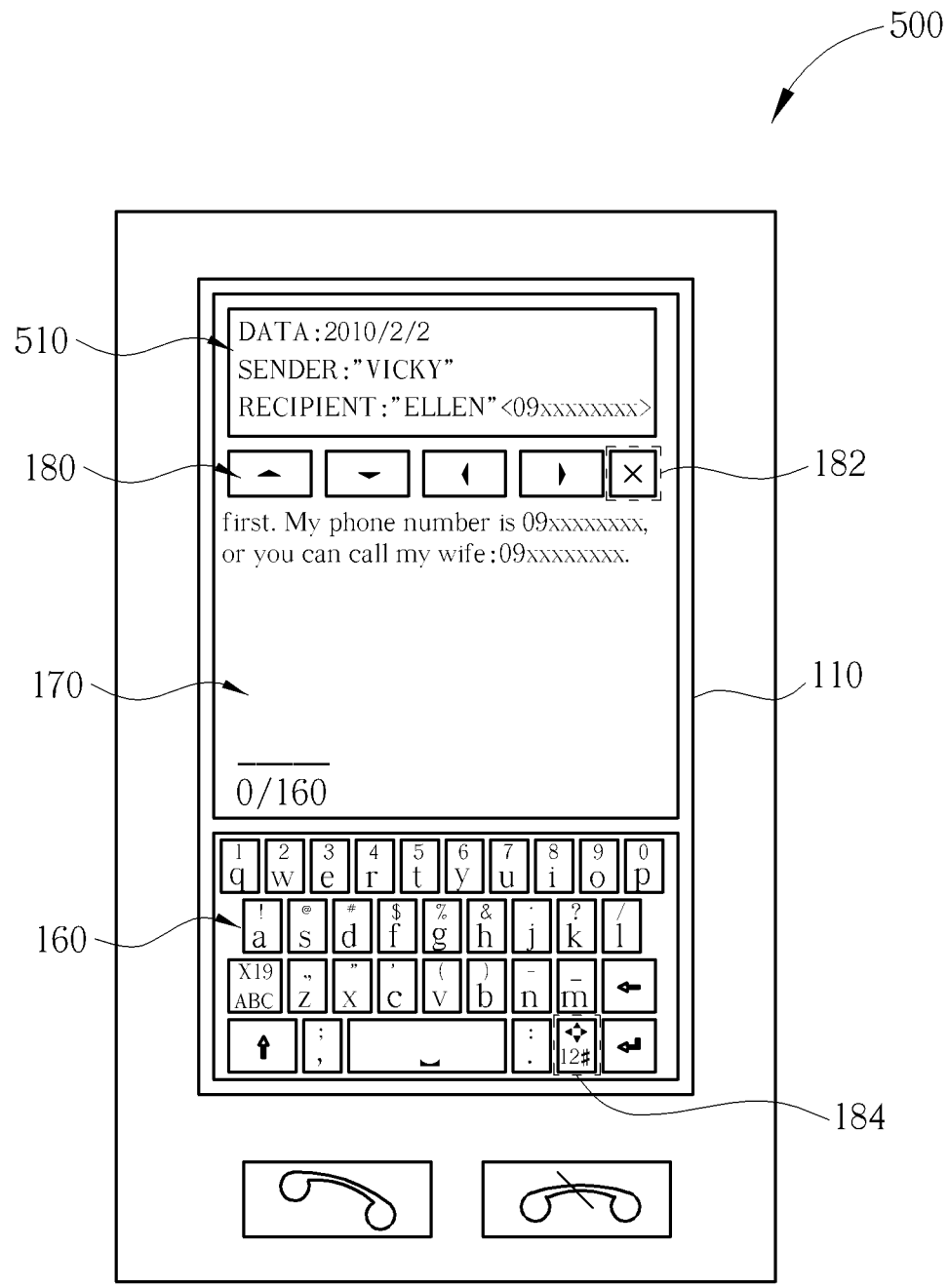

Please refer to FIG. 4 together with FIG. 5. FIG. 4 and FIG. 5 are schematic diagrams of an electronic device for controlling a software direction pad of the electronic device according to another example of the present application. As FIG. 4 and FIG. 5 depict, FIG. 4 indicates a condition that a software direction pad is inactivated while FIG. 5 indicates another condition that the software direction pad 180 is activated. Moreover, in FIG. 5, the displayed position of the software direction pad 180 is dynamically adjusted according to a displayed position of a designated character string 510 related to the editing area 170 to make the software direction pad 180 not cover the designated character string 510. However, due to the displayed position of the cursor 190 is not taken into consideration under this condition, the cursor 190 may be covered by the software direction pad 180.

Hence in another example, both the displayed position of the designated character string 510 related to the editing area 170 and a displayed position of the cursor 190 should be taken into consideration. Please also refer to FIG. 6, the displayed position of the software direction pad 180 is dynamically adjusted according to the displayed position of the designated character string 510 related to the editing area 170 and a displayed position of the cursor 190 to make the software direction pad 180 not cover the designated character string 510 and the cursor 190.

Figure 6:
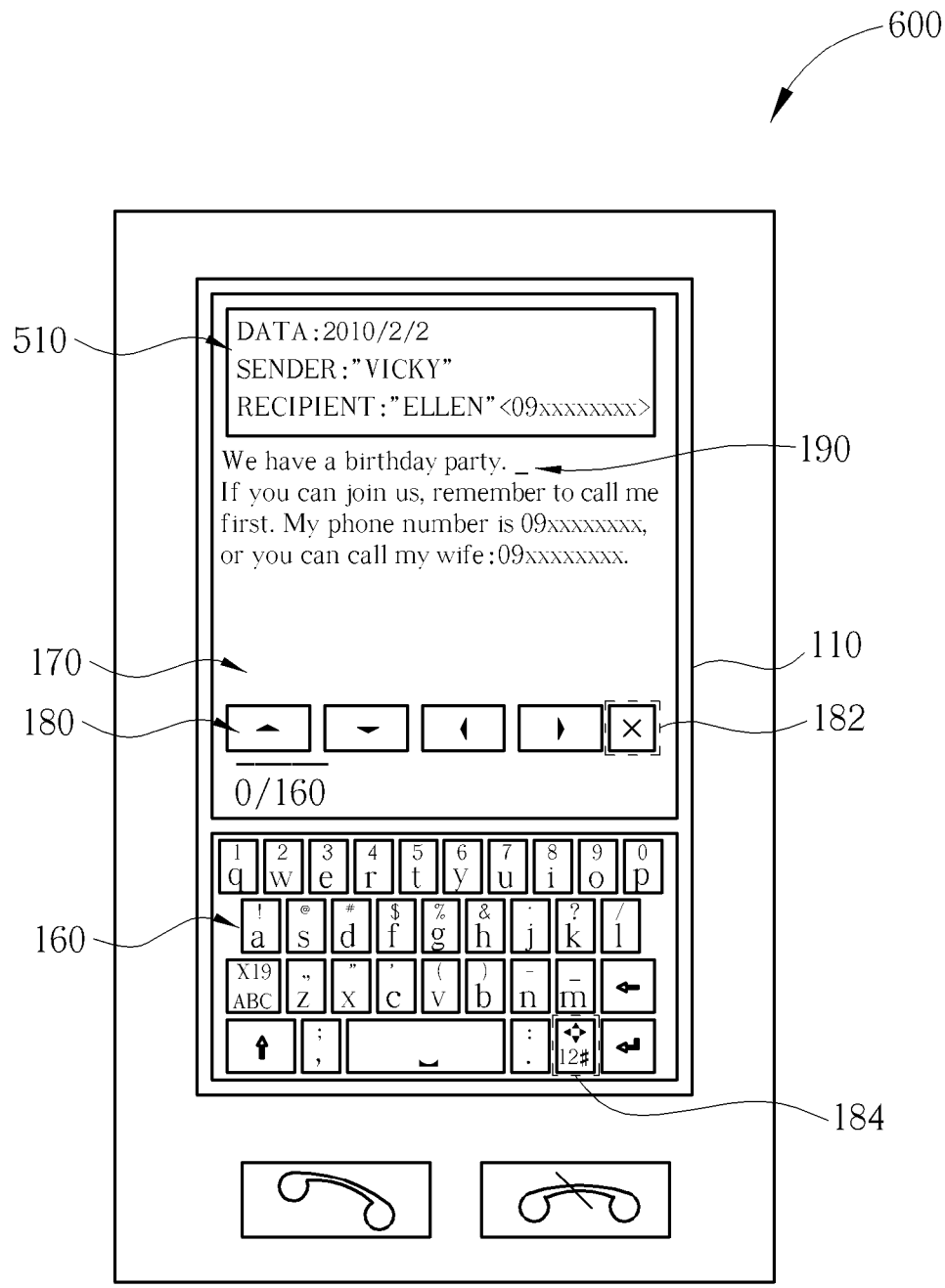
FIG. 6 is a schematic diagram of an electronic device for controlling a software direction pad of the electronic device according to still another example of the present application.
Figure 7:
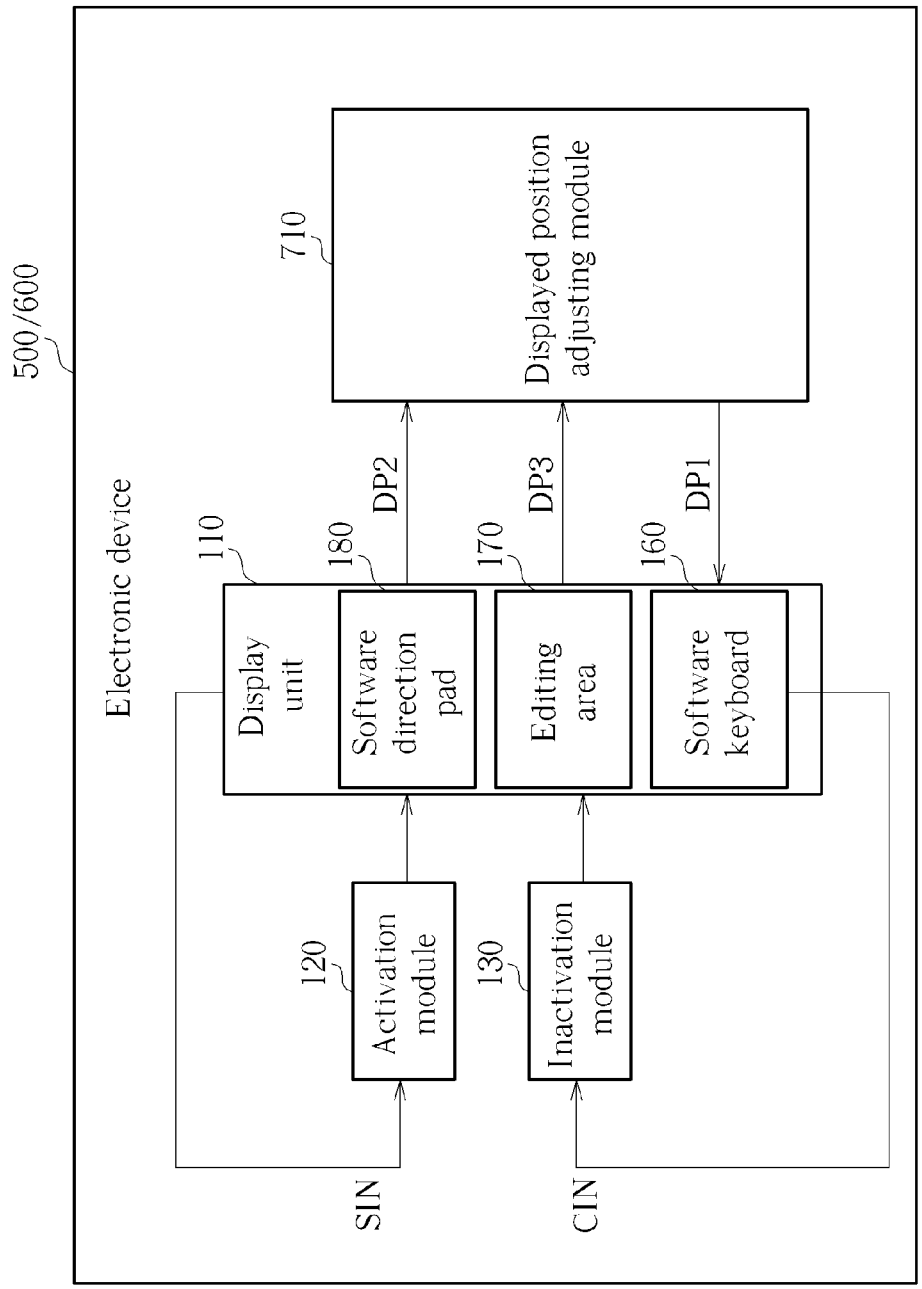
FIG. 7 is a block diagram of an electronic device for controlling a software direction pad of the electronic device according to a third example of the present application.

Please refer to FIG. 7 together with FIG. 5 or FIG. 6. FIG. 7 is a block diagram of the electronic device 500/600 shown in FIG. 5 or FIG. 6. In FIG. 7, the architecture of the electronic device 500/600 is similar to that of the electronic device 100 shown in FIG. 3, and the difference between them is that the electronic device 500/600 further includes a displayed position adjusting module 710 coupled to the display unit 110. In one example, the displayed position adjusting module 710 may be configured to dynamically adjust the displayed position (e.g., DP1) of the software direction pad 180 according to the displayed position (e.g., DP2) of the designated character string 510 related to the editing area 170. In another example, the displayed position adjusting module 710 may be configured to dynamically adjust the displayed position DP1 of the software direction pad 180 according to the displayed position (e.g., DP2) of the designated character string 510 related to the editing area 170 and the displayed position (e.g., DP3) of the cursor 190. Those skilled in the art should appreciate that various modifications to the way how the displayed position adjusting module 710 adjusts the displayed position DP1 of the software direction pad 180 may be made without departing from the spirit of the present application, which also belongs to the scope of the present application.

Figure 8:
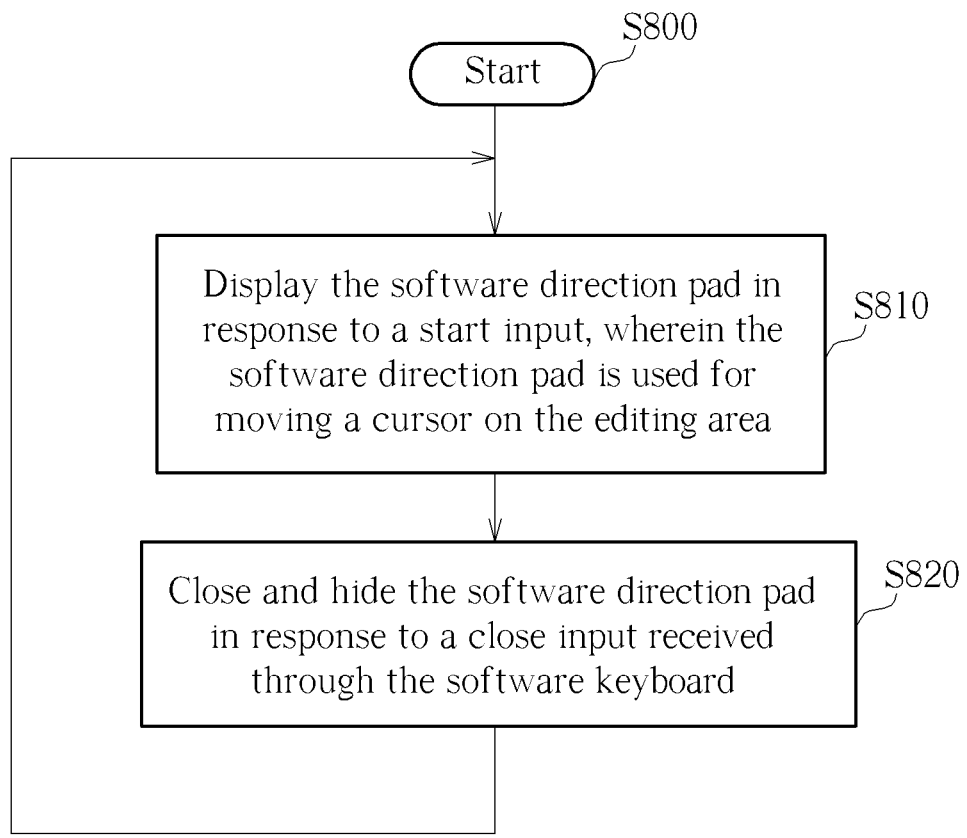
FIG. 8 is a flowchart illustrating a method for controlling a software direction pad of an electronic device according to an example of the present application.

Please refer to FIG. 8. FIG. 8 is a flowchart illustrating a method for controlling a software direction pad of an electronic device according to an example of the present application. The method includes, but is not limited to, the following steps:

Step S800: Start.

Step S810: Display the software direction pad in response to a start input, wherein the software direction pad is used for moving a cursor on the editing area.

Step S820: Close and hide the software direction pad in response to a close input received through the software keyboard.

How each element operates can be known by collocating the steps shown in FIG. 8 together with the elements shown in FIG. 1, FIG. 2, and FIG. 3. For example, the Step S810 can be executed by the activation module 120 and the display unit 110, and the Step S820 can be executed by the inactivation module 130 and the display unit 110. Therefore, further description for the operations of the steps shown in FIG. 8 is omitted here for brevity.

Figure 9:
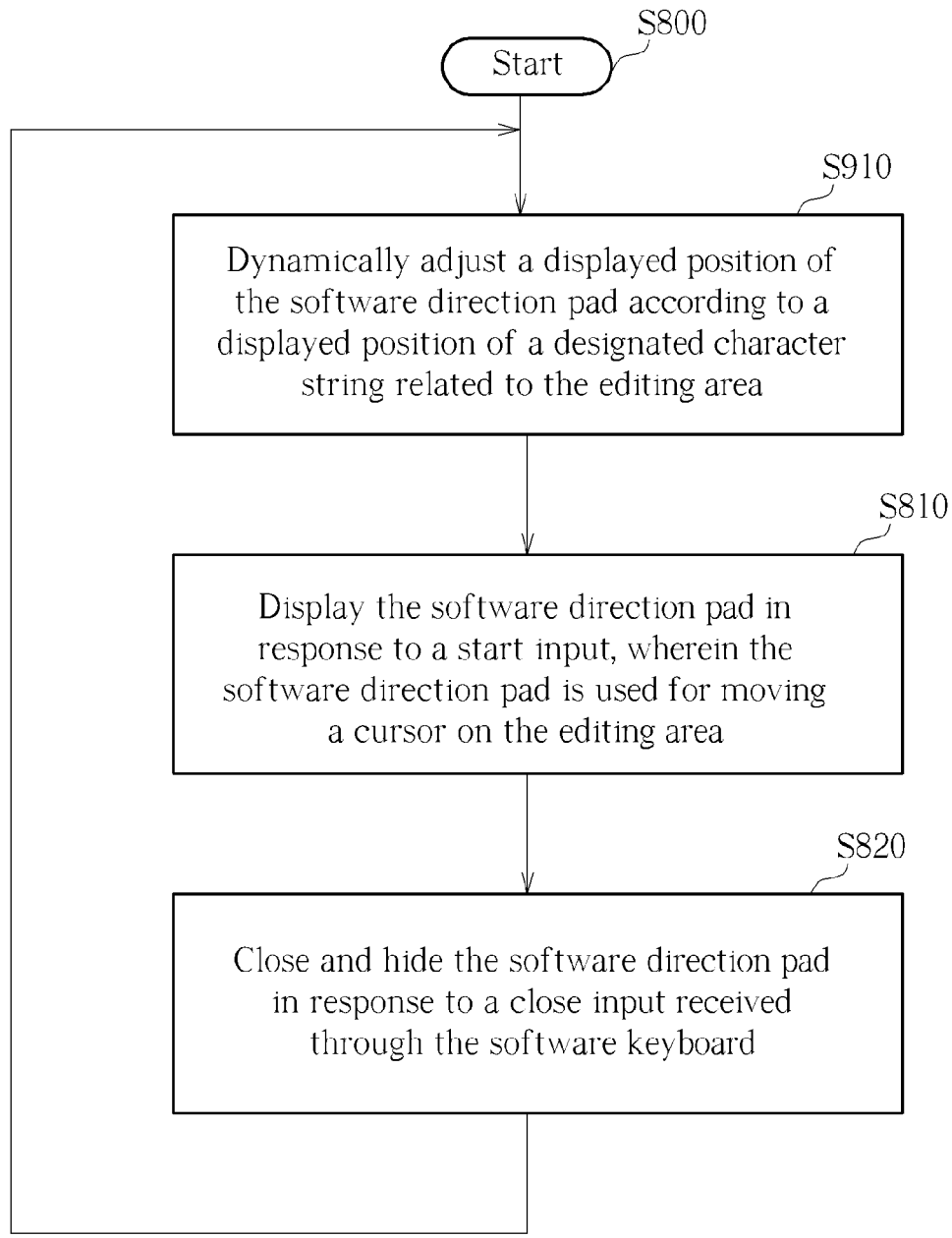
FIG. 9 is a flowchart illustrating a method for controlling a software direction pad of an electronic device according to another example of the present application.

Please refer to FIG. 9. FIG. 9 is a flowchart illustrating a method for controlling a software direction pad of an electronic device according to another example of the present application. The method includes, but is not limited to, the following steps:

Step S800: Start.

Step S910: Dynamically adjust a displayed position of the software direction pad according to a displayed position of a designated character string related to the editing area.

Step S810: Display the software direction pad in response to a start input, wherein the software direction pad is used for moving a cursor on the editing area.

Step S820: Close and hide the software direction pad in response to a close input received through the software keyboard.

The steps shown in FIG. 9 are similar to the steps shown in FIG. 8, and the difference between them is that FIG. 9 further adds one step for dynamically adjust the displayed position of the software direction pad (i.e., S910) into the flowchart. How each element operates can be known by collocating the steps shown in FIG. 9 together with the elements shown in FIG. 7 and FIG. 5 (or FIG. 6). For example, the Step S910 can be executed by the displayed position adjusting module 710. Please note that, those skilled in the art should appreciate that various modifications of the steps in the abovementioned flowcharts may be made without departing from the spirit of the present application. As an illustration, in Step 910, the displayed position of the software direction pad can also be dynamically adjusted according to both the displayed position of the designated character string related to the editing area as well as the displayed position of the cursor. As another illustration, in Step 820, a user still can use a close button corresponding to the software direction pad to close and hide the software direction pad.

Please note that, the steps of the abovementioned flowcharts are merely practicable examples of the present application, and in no way should be considered to be limitations of the scope of the present application. These methods, as shown in FIG. 8 and FIG. 9, can include other intermediate steps or several steps can be merged into a single step without departing from the spirit of the present application. In addition, the abovementioned steps are not limited to be performed according to the exact sequence shown in FIG. 8 or FIG. 9 if a roughly identical result can be obtained.

Additionally, a computer-readable medium is disclosed according to an example of the present application. When the computer-readable medium is loaded to an electronic device equipped with buffer memory, the electronic device executes instructions for performing a method for controlling a software direction pad of an electronic device disclosed in the present application.

The abovementioned examples are presented merely for describing the features of the present application, and in no way should be considered to be limitations of the scope of the present application. In summary, the present application provides a method for controlling a software direction pad of an electronic device, a computer-readable medium, and a related electronic device. By adopting the mechanism disclosed in the present application, the software direction pad can be automatically displayed and closed/hided with an easy way. When the start input SIN corresponding to the software direction pad is generated, the software direction pad will be displayed on the display unit; and when the close input CIN (received through the software keyboard 160 or generated from a close button corresponding to the software direction pad) is generated, the software direction pad will be automatically closed and hided. Therefore, with the activation of the software direction pad, it could bring a lot convenience to a user to move the cursor on the editing area while doing edits on the electronic device. Additionally, the software direction pad can be (automatically) closed and hided if it is not in use, such that the editing area won't be occupied by the software direction pad and will has a larger visual screen. In addition, by adding the displayed position adjusting module into the electronic device, the displayed position of the software direction pad can be taken into account and can be dynamically adjusted. Therefore, some important character strings (such as titles) and/or the cursor won't be covered by the software direction pad. As a result, the dynamical software direction pad design disclosed in the present application can provide a better software direction pad to fulfill the user's demands, and brings more convenience to the user.

Those skilled in the art will readily observe that numerous modifications and alterations of the device and method may be made while retaining the teachings of the application.

What is claimed is:

1. A method for controlling a software direction pad of an electronic device, the electronic device displaying a software keyboard, a software direction pad and an editing area, the method comprising:
    displaying the software keyboard;
    after displaying the software keyboard, displaying the software direction pad in the editing area in response to a start input;
    using the software direction pad for moving a cursor on the editing area;
    dynamically adjusting a displayed position of the software direction pad according to a displayed position of a designated character string related to the editing area and a displayed position of the cursor; and
    closing and hiding the software direction pad in response to a user typing a letter into the editing area of the software keyboard.

2. The method of claim 1, wherein the start input is received through a start button corresponding to the software direction pad.

3. The method of claim 1, wherein the start input is received through the editing area.

4. The method of claim 1, wherein the start input is received through a designated area comprising the cursor in the editing area.

5. The method of claim 1 further comprising generating the close input when a close button corresponding to the software direction pad is touched.

6. A non-transitory computer-readable medium storing a computer program having instructions for performing a method for controlling a software direction pad of an electronic device having a display device, which cause the electronic device, when loaded, to execute the following steps:

displaying a software keyboard on the display device;

after displaying the software keyboard, displaying the software direction pad in an editing area of the of the display device in response to a start input, wherein a displayed position of the software direction pad is dynamically adjusted according to a displayed position of a designated character string related to the editing area and a displayed position of a cursor;

using the software direction pad for moving the cursor on the editing area; and closing and hiding the software direction pad in response to a close input corresponding to the software direction pad.

7. The non-transitory computer-readable medium of claim 6, wherein the start input is received through a start button corresponding to the software direction pad.

8. The non-transitory computer-readable medium of claim 6, wherein the start input is received through the editing area.

9. The non-transitory computer-readable medium of claim 6, wherein the start input is received through a designated area comprising the cursor in the editing area.

10. The method of claim 6 further comprising generating the close input when a close button corresponding to the software direction pad is touched.

11. An electronic device, comprising:

a display unit, configured to display a software keyboard, a software direction pad and an editing area;

an activation module, coupled to the display unit, configured to control the display unit to display the software direction pad in the editing area in response to a start input, wherein the software direction pad is used for moving a cursor on the editing area;

a displayed position adjusting module, coupled to the display unit, configured to dynamically adjust a displayed position of the software direction pad according to a displayed position of a designated character string related to the editing area and a displayed position of the cursor; and an inactivation module, coupled to the display unit, configured to close and hide the software direction pad in response to reception of signal generated when the software keyboard is used by the user to do edits.

12. The electronic device of claim 11, wherein the inactivation module closes and hides the software direction pad in response to a user typing into the editing area of the software keyboard.

13. The electronic device of claim 11, wherein:

the activation module is coupled to a start button corresponding to the software direction pad, and the start input is received through the start button.

14. The electronic device of claim 11, wherein:

the activation module is coupled to the display unit, and the start input is received through the editing area.

15. The electronic device of claim 11, wherein:

the inactivation module is coupled to the display unit, and the start input is received through the editing area.

16. The electronic device of claim 11, wherein the electronic device comprises a touch-controlled device, and the display unit comprises a touch screen.

17. The electronic device of claim 11, wherein the inactivation module further closes and hides the software direction pad in response to receiving a close input through a close button corresponding to the software direction pad being touched.

* * * * *